(12) United States Patent
Galvez et al.

(10) Patent No.: US 10,964,145 B2
(45) Date of Patent: Mar. 30, 2021

(54) ACCESS CONTROL SYSTEM USING BLOCKCHAIN LEDGER

(71) Applicant: Sensormatic Electronics, LLC, Boca Raton, FL (US)

(72) Inventors: Miguel Galvez, Plaistow, NH (US); Matthew Roberts, North Chelmsford, MA (US); Stephen Tarmey, Leominster, MA (US); Ashwin Reddy Lingannagari, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/112,041

(22) Filed: Aug. 24, 2018

(65) Prior Publication Data

US 2020/0066072 A1 Feb. 27, 2020

(51) Int. Cl.
*G07C 9/00* (2020.01)
*H04L 9/06* (2006.01)
(Continued)

(52) U.S. Cl.
CPC ........... *G07C 9/27* (2020.01); *G06F 21/6218* (2013.01); *G06Q 20/389* (2013.01);
(Continued)

(58) Field of Classification Search
CPC ..... H04L 2209/38; H04L 41/08; H04L 63/20; H04L 67/12; H04L 9/0637; H04L 9/0819; H04L 9/0872; H04L 9/3213; H04L 9/3236; H04L 9/3297; H04L 2209/805; H04L 41/0806; H04L 41/28; H04L 63/00; H04L 9/3239; H04L 2209/56; H04L 63/12; H04L 9/0643; H04L 9/3247; G06F 21/645;
(Continued)

(56) References Cited

U.S. PATENT DOCUMENTS

| | | | |
|---|---|---|---|
| 2014/0316561 A1* | 10/2014 | Tkachenko | ............. G07F 11/02 700/236 |
| 2017/0103468 A1 | 4/2017 | Orsini et al. | |

(Continued)

*Primary Examiner* — Dionne Pendleton
(74) *Attorney, Agent, or Firm* — HoustonHogle LLP

(57) ABSTRACT

A distributed transaction ledger (e.g. blockchain) is used to control access through access points in an access control system. During normal operation, access control devices (e.g. system controllers and door controllers) generate and broadcast transaction information to a validation network. The validation network maintains a distributed transaction ledger for the access control system, for example, by validating and distributing the transaction information across the validation network according to predetermined consensus criteria. The devices perform access control functions based on transaction information retrieved from the transaction ledger. Door controllers receive identification information from user devices (e.g. identification badges, mobile computing devices) and send the identification information to the validation network. A predetermined number of responding nodes generate verification information based on authorization information in the transaction ledger. If a predetermined proportion of the responding nodes indicate that the occupant is authorized, access is granted by the door controller.

32 Claims, 9 Drawing Sheets

(51) Int. Cl.
*G07C 9/27* (2020.01)
*H04L 29/08* (2006.01)
*H04L 9/32* (2006.01)
*G06Q 20/38* (2012.01)
*H04L 29/06* (2006.01)
*G06F 21/62* (2013.01)

(52) U.S. Cl.
CPC ........ *G07C 9/00571* (2013.01); *H04L 9/0637* (2013.01); *H04L 9/321* (2013.01); *H04L 63/00* (2013.01); *H04L 67/1061* (2013.01); *H04L 67/1097* (2013.01); *G07C 2009/00412* (2013.01); *G07C 2209/62* (2013.01); *H04L 2209/38* (2013.01)

(58) Field of Classification Search
CPC ... G06F 8/31; G06F 8/41; G06F 8/433; G06F 8/443; G06F 8/452; G06Q 10/0833; G07C 9/00111; G07C 9/00571; G07C 9/28; H04W 12/0802; H04W 12/1008; H04W 12/1202; H04W 4/38; H04W 12/0023; H04W 4/70
See application file for complete search history.

(56) References Cited

U.S. PATENT DOCUMENTS

| | | | |
|---|---|---|---|
| 2018/0102007 A1* | 4/2018 | Trani | G07C 9/00111 |
| 2018/0121662 A1 | 5/2018 | Pelton | |
| 2018/0285837 A1* | 10/2018 | Wu | G06Q 20/06 |
| 2018/0328612 A1 | 11/2018 | Sinha et al. | |
| 2019/0012637 A1* | 1/2019 | Gillen | G06Q 10/0833 |
| 2019/0268162 A1* | 8/2019 | Sahagun | H04L 9/0891 |
| 2019/0287146 A1 | 9/2019 | Maitland et al. | |
| 2019/0342095 A1* | 11/2019 | Simons | H04L 63/12 |
| 2019/0361917 A1* | 11/2019 | Tran | G06Q 40/04 |
| 2019/0373472 A1* | 12/2019 | Smith | H04W 12/0802 |
| 2019/0378142 A1* | 12/2019 | Darnell | G06F 21/645 |
| 2020/0059365 A1* | 2/2020 | Hyland | G06F 21/6218 |
| 2020/0106610 A1* | 4/2020 | Doddavula | H04L 63/10 |
| 2020/0195442 A1* | 6/2020 | Wright | G06F 8/31 |
| 2020/0234386 A1* | 7/2020 | Blackman | H04L 9/0894 |
| 2020/0287719 A1* | 9/2020 | Hildebrand | H04L 9/3239 |

* cited by examiner

ACCESS CONTROL SYSTEM USING BLOCKCHAIN LEDGER

RELATED APPLICATIONS

This application is related to U.S. application Ser. No. 16/111,998 filed on Aug. 24, 2018, entitled "Building Management System with Blockchain Ledger," now U.S. Patent Publication No.: 2020/0064796 A1, and U.S. application Ser. No. 16/112,030 filed on Aug. 24, 2018, entitled "Event Engine for Building Management System using Distributed Devices and Blockchain Ledger," now U.S. Patent Publication No.: 2020/0064792 A1, both of which are incorporated herein by reference in their entirety.

BACKGROUND OF THE INVENTION

Access control systems are often installed within premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Access control systems typically include control panels such as system controllers and distributed devices such as door controllers, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors, signaling that doors should be unlocked, and activating elevators. Alarms can be generated upon unauthorized entry.

For example, access control system controllers are used to evaluate information received at access points by the various door controllers and readers to determine whether credentials are authorized to access the associated access point. In one example, a person presents an access control badge to the reader which retrieves the information stored on the card. That information is transmitted to the controller which does a look-up in an access control list. If the information is associated with a person such as an occupant of the building having access privileges for the associated access point, the door strike is sent an unlock signal and the person granted access through the access point.

At the same time, distributed ledgers are decentralized data storage systems in which multiple instances of the same data are stored as local ledger copies on nodes of a peer to peer network. The distributed ledger indicates information through a series of transactions, which are validated by the nodes, for example, by confirming that the transactions are compatible with the transaction history indicated by the local ledger copy. Validated transactions are propagated across the network as new ledger entries, and the local ledger copies are synchronized according to consensus algorithms that determine an authoritative version of the ledger based on consensus criteria, which can include which nodes were first to solve a cryptographic puzzle, a chance selection weighted such that nodes representing entities with more ownership stake in the ledger have a higher chance of selection, voting systems, among other examples. One type of distributed ledger is a blockchain. In a blockchain, the transactions are organized into blocks, which are then validated and propagated across the peer to peer network. Along with the transaction information, each block contains a cryptographic hash of the full contents of the previous block, forming chains of linked blocks that can be traced back to the original block of the blockchain. Blockchains prevent alteration of any of the blocks, as any change to a block would require changes to the cryptographic hashes contained in every subsequent block.

SUMMARY OF THE INVENTION

One problem that arises in these access control systems is the possibility for a hacker (for example) to alter the access control list in order to grant access to themselves or others to particular access points for which they would otherwise would not be authorized.

This problem can be mitigated through the use of distributed ledger technology, such as a block chain. In such a system, the access control list might be implemented using a transaction ledger that is distributed among a number of nodes, including, for example, a combination of access control system controllers, door controllers and/or other distributed devices having sufficient memory to store local copies of the transaction ledger. When the door controllers and/or door readers receive information (e.g. identification information) from an access badge or other device, that information is compared to the various local copies of the access control list stored on the transaction ledger by nodes of a validation network. If all or a percentage of the local copies of the access control list indicate that the person should not have access to the door, then the door will not be unlocked. However, if one or more of the copies of the access control list have been modified to indicate that the person should have access to the door while the others indicate that they should not have access, the door will not be opened.

The door is only opened when all or a percentage of the distributed copies of the access control list indicate that the person should be allowed to access the door. The number of local copies of the access control list that are queried will vary based on the specific architecture of the system and/or based on predetermined quorum information identifying the number and quality of access control lists that need to be queried during each access attempt. For example, for faster access a smaller quorum can be used. For greater security, on the other hand, a larger quorum can be used, as the larger the number of nodes queried, the more difficult it will be to hack the system, for example, to gain unauthorized access.

Likewise, distributed transaction ledger can be used to secure the access control history of a particular system or site. As such information is stored, for example, in a private or public encrypted block chain, accurate and uncorrupted access control event information can be provided with a proven chain of custody in response to security incidents or audits, among other examples.

In general, according to one aspect, the invention features a method of operation of an access control system of a premises. Door controllers of the access control system receive identification information from user devices. Nodes of a validation network of the access control system receive the identification information from the door controllers, generate verification information based on the identification information and on local copies of a transaction ledger and send the verification information to the door controllers. The door controllers control access to access points of the premises based on the verification information.

In embodiments, the transaction ledger is a blockchain that includes authorization information for the access points such as contracts associating identification information for the users with identification information for the access points for which the users are authorized. In this case, the nodes generate verification information indicating that the users are authorized to access the access points in response to determining that valid contracts between the users and the access points exist, and verification information indicating that the users are not authorized to access the access points in response to determining that valid contracts between the users and the access points do not exist. The nodes can be system controllers and/or door controllers of the access control system. Which of the nodes receives the identification information and generates the verification information is selected based on predetermined quorum information for the validation network. The door controllers grant access in response to determining that all of the verification information received from the nodes indicates that the users are authorized. On the other hand, the door controllers deny access in response to determining that the verification information received from one or more of the nodes indicates that the users are not authorized.

In general, according to another aspect, the invention features an access control system of a premises, the system comprising door controllers and a validation network. The door controllers receive identification information from user devices and control access to access points of the premises. Nodes of the validation network receive the identification information from the door controllers, generate verification information based on the identification information and on local copies of a transaction ledger and send the verification information to the door controllers. The door controllers control access to the access points based on the verification information.

In general, according to another aspect, the invention features a method of operation of an access control system of a premises. Door controllers of the access control system control access to access points of the premises and generate transaction information. A validation network receives the transaction information, generates new ledger entries for a transaction ledger based on the transaction information, and distributes the new ledger entries.

In embodiments, nodes of the validation network (e.g. system controllers or door controllers that generate and distribute the new ledger entries) store local copies of the transaction ledger, which is a blockchain. The nodes determine an authoritative version of the transaction ledger based on predetermined consensus criteria. The validation network validates the transaction information based on encrypted identification information included in the transaction information for the door controllers that generated the transaction information or based on the transaction ledger. The validation network generates the new ledger entries based on a predetermined proof-of-work and/or proof-of-stake operation.

In general, according to another aspect, the invention features an access control system of a premises, the system comprising door controllers and a validation network. The door controllers control access to access points of the premises and generate transaction information. Nodes of the validation network receive the transaction information, generate new ledger entries for a transaction ledger based on the transaction information, and distribute the new ledger entries.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
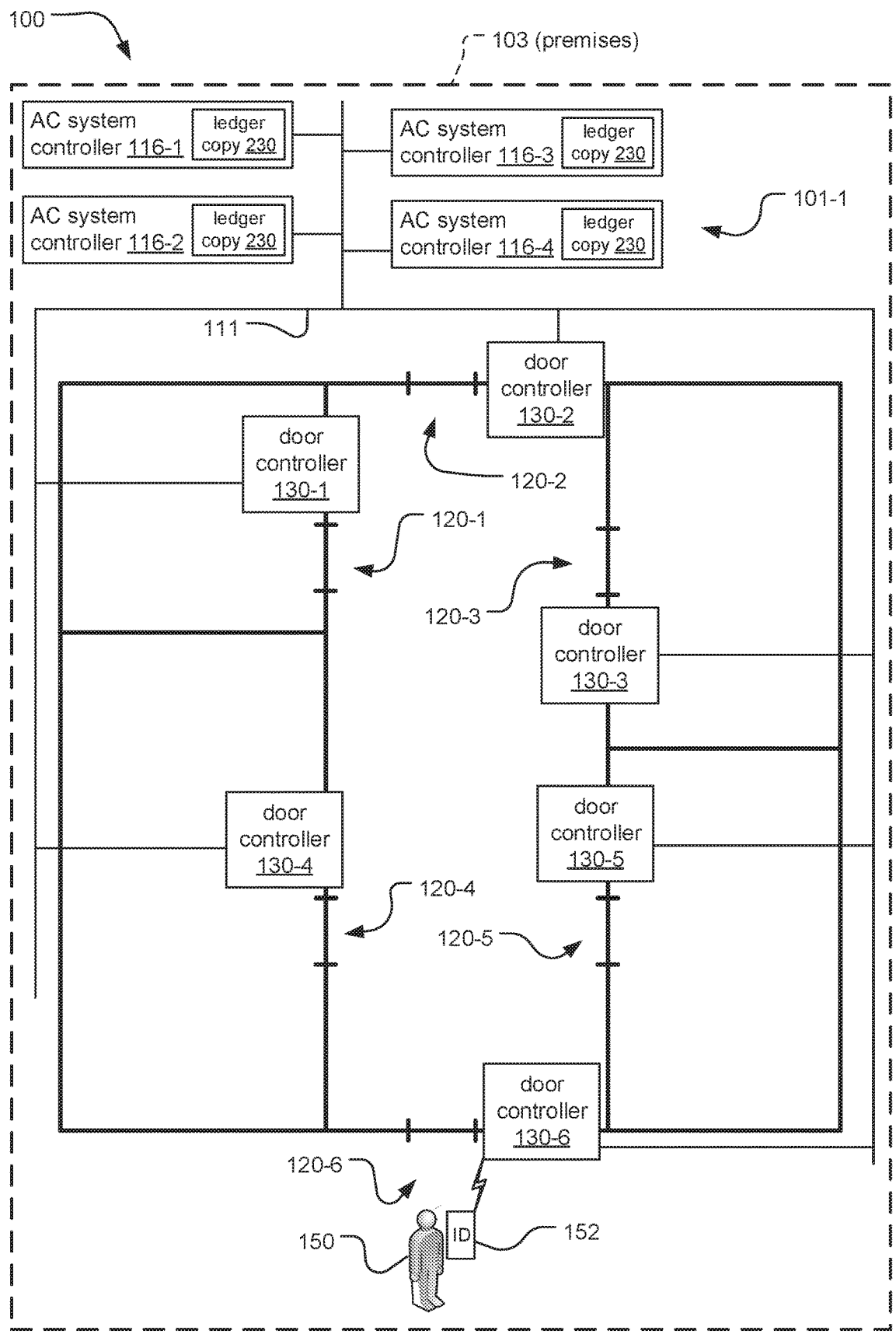
FIG. 1A is a schematic diagram of an access control system, according to an embodiment of the present invention in which a validation network of the access control system includes only system controllers of the access control system.

FIG. 1A is a schematic diagram of an access control system 100, according to an embodiment of the present invention.

The access control system 100 is installed at a premises such as a building 103 (e.g office, hospital, warehouse, retail establishment, shopping mall, school, multi-unit dwelling, government building, or casino) and controls access through access points 120 (e.g. doors, hallways, elevators) to restricted areas of the building 103.

The access control system 100 includes a series of system controllers 116 and distributed devices such as door controllers 130. The access control system controllers 116 and the door controllers 130 communicate with each other via a safety and automation network 111 of the building 103. These safety and automation networks 111 support digital and/or analog communication between the devices. In some embodiments (not illustrated), distributed devices from multiple different building management systems could all be connected to the same safety and automation network 111. The safety and automation network 111 can also include a public and/or private network, which can be a leased data connection, a private network built for a specific enterprise client and/or a public network such as the internet, in examples.

The door controllers 130 are positioned throughout the building 103 at particular access points 120 and control access through the access points 120 based on input such as identification information received from occupants 150 of the building 103 seeking access to the restricted areas. The door controllers 130 receive the identification information, for example, from the occupants 150 engaging with user interface elements of the door controllers 130 (e.g. entering passcodes, swiping keycards, or bringing user devices 152 such as identification badges, contactless smart cards and/or mobile computing devices within range of wireless receivers of the door controllers 130). Upon verification of the identification information, the door controllers 130 grant access through the access points 120 (e.g. by unlocking a door via a door strike). The door controllers 130 might also include door position sensors for determining the status of access points 120 such as whether they are locked, unlocked, open or closed.

The identification information is typically associated with the individual occupants 150 and might include credentials (e.g. user name and password) and/or a unique ID for each of the user devices 152 and/or occupant 150, tokens created by a token server of the access control system 100 which functions at the enterprise level or is owned by a different business entity, among other examples.

The system controllers 116 direct the functionality of the access control system 100 by communicating with the door controllers 130 and/or other distributed devices. In different embodiments, the system controllers 116 verify identification information received from the door controllers 130, for example, by confirming that the occupants 150 associated with the identification information are authorized to access specific access points 120 based on the authorization information and sending instructions to the door controllers 130 to open or unlock the selected access points 120. The system controllers 116 might also generate and maintain information used by the access control system 100 such as access control events, which include information about access points 120 that were engaged with, including date and time information and the identity of the occupants 150 who engaged with the access points 120, along with door position information from the access points 120, among other examples.

During normal operation of the access control system 100, the system controllers 116 and door controllers 130 generate transaction information and broadcast the transaction information to nodes of a peer-to-peer validation network 101. Collectively, the nodes of the validation network 101 maintain a distributed transaction ledger (e.g. a blockchain) for the access control system 100, for example, by validating the transaction information and distributing the transaction information across the validation network 101 (e.g. according to predetermined consensus criteria) to be stored locally in multiple instances by the individual nodes. The validation network 101 can be a publicly accessible distributed ledger such as a public blockchain, or it can be privately administered, with access restricted to only authorized devices. In different embodiments, the nodes of the validation network 101 can be system controllers 116, door controllers 130, and/or other distributed devices of the access control system 100 operating as nodes of the validation network 101 (e.g. executing processes for maintaining the distributed transaction ledger and storing local copies of the transaction ledger in memory) in addition to performing access control functions. The system controllers 116, door controllers 130 and other distributed devices of the access control system 100 access the transaction information stored on the distributed transaction ledger and perform access control functions as previously described based on the transaction information.

The transaction information stored on the transaction ledger for the access control system 100 includes status information such as status changes for the door controllers 130 and/or the system as a whole (such as whether access points 120 are locked or unlocked, or access control events indicating identification information and access point information for each time an access point 120 is engaged with by an occupant 150 and whether access was granted or denied), instructions sent from the system controllers 116, door controllers 130 or other distributed devices to other devices, authorization information (e.g. an access control list indicating authorized occupants 150 of the building 103 for each access point 120), configuration information, device authorization information indicating which system controllers 116, door controllers 130 or other distributed devices are authorized to access the distributed ledger or perform particular access control functions, and/or verification information for access control attempts. The transaction information also includes time and date information. In this way, the distributed ledger for the access control system 100 includes a log of access control events and historical configuration information and user authorization information, which are permanently added to the ledger in real time and can be accessed by the system controllers 116, door controllers 130 and other distributed devices, technicians and/or security personnel.

In the illustrated example, the access control system 100 of the building 103 includes four system controllers 116-1, 116-2, 116-3, 116-4 and six door controllers 130-1, 130-2, 130-3, 130-4, 130-5, 130-6 positioned respectively at six access points 120-1, 120-2, 120-3, 120-4, 120-5, 120-6 controlling access through the access points 120. The validation network 101-1 includes only the system controllers 116, each of which executes functions associated with maintaining the distributed transaction ledger and stores a local copy of the transaction ledger 230. The user device 152 (e.g. an identification badge) of the occupant 150 wirelessly transmits the identification information to the door controller 130-6 controlling access through the access point 120-6. The door controller 130-6 generates the transaction information (e.g. including the identification information received from the user device 152) and broadcasts it to the validation network 101-1. The nodes of the validation network 101-1, including system controllers 116-1, 116-2, 116-3, 116-4, collectively validate and distribute the transaction information and send instructions to the door controller 130-6 based on transaction information retrieved from the transaction ledger.

Figure 1B:
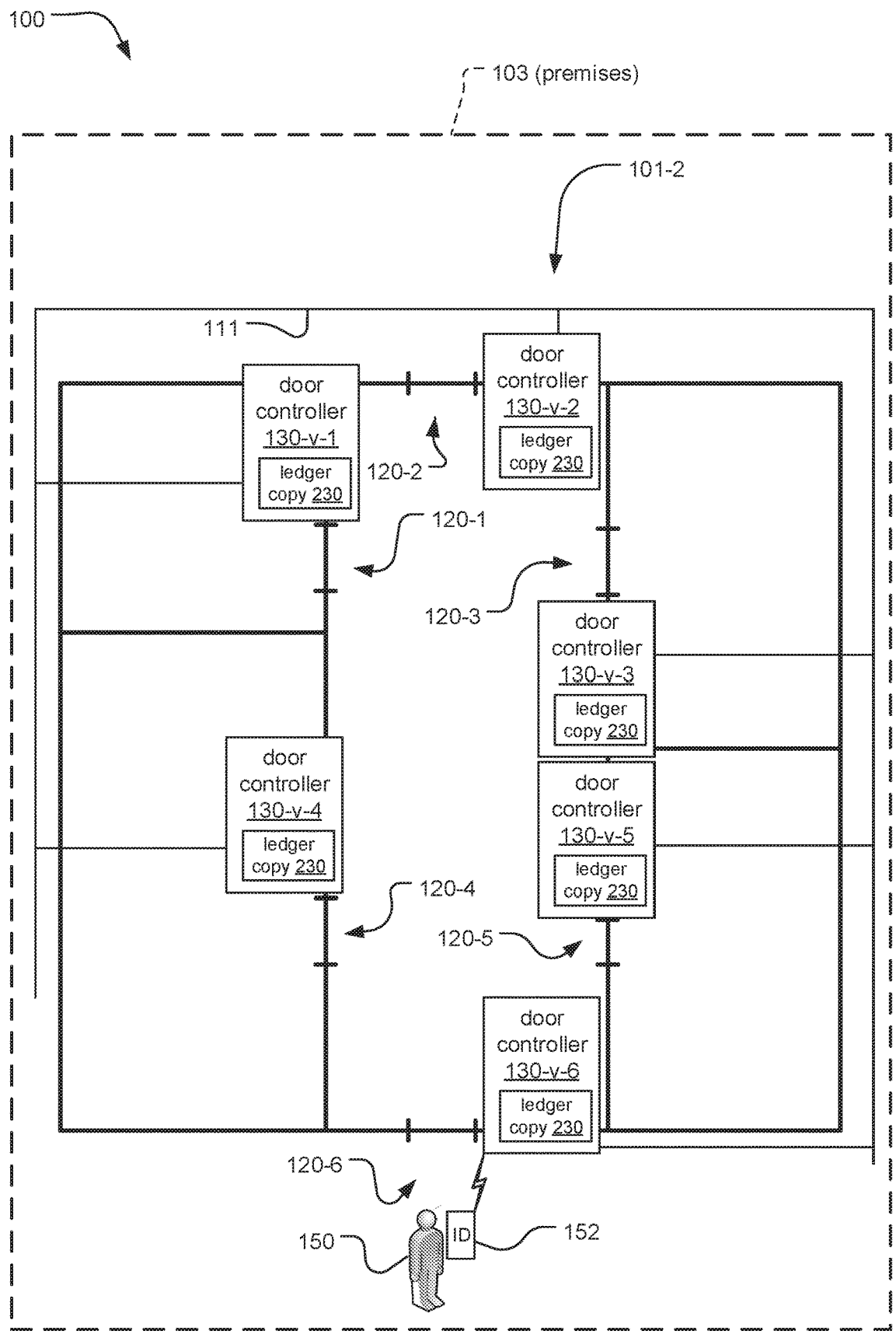
FIG. 1B is a schematic diagram of the access control system, according to another embodiment of the present invention in which the validation network includes only door controllers of the access control system.

FIG. 1B is a schematic diagram of the access control system 100, according to another embodiment of the present invention in which the validation network 101-2 includes only door controllers 130 and no system controllers 116. Now, the access control system 100 includes validator door controllers 130-v, which perform the functions associated with validating the transaction information and maintaining the distributed ledger in addition to the previously described access control functions. In this embodiment, the validator door controllers 130-v form the peer-to-peer validation network 101-2 and broadcast generated transaction information to other validator door controllers 130-v to be validated, distributed and added to the distributed ledger. The validator door controllers 130-v also store local copies of the transaction ledger 230.

Figure 1C:
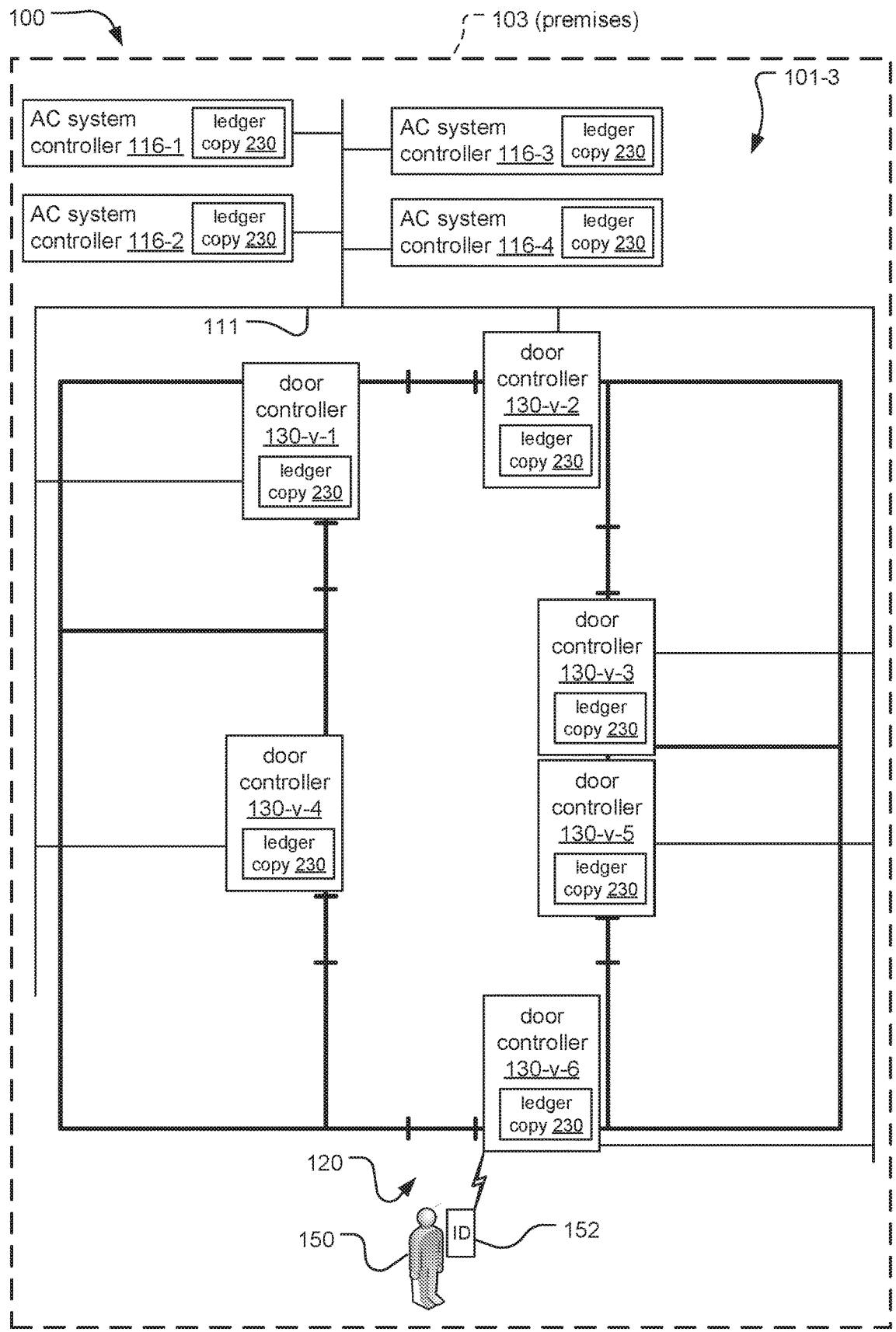
FIG. 1C is a schematic diagram of the access control system, according to another embodiment of the present invention in which the validation network includes both door controllers and system controllers.

FIG. 1C is a schematic diagram of the access control system 100, according to another embodiment of the present invention in which the validation network 101-3 includes both door controllers 130 and system controllers 116. Here, the system controllers 116, together with the validator door controllers 130-v, form the peer-to-peer validation network 101-2 and broadcast generated transaction information to other system controllers 116 and validator door controllers 130-v to be validated, distributed and added to the distributed ledger. Each of the devices also stores local copies of the transaction ledger 230.

Figure 2:
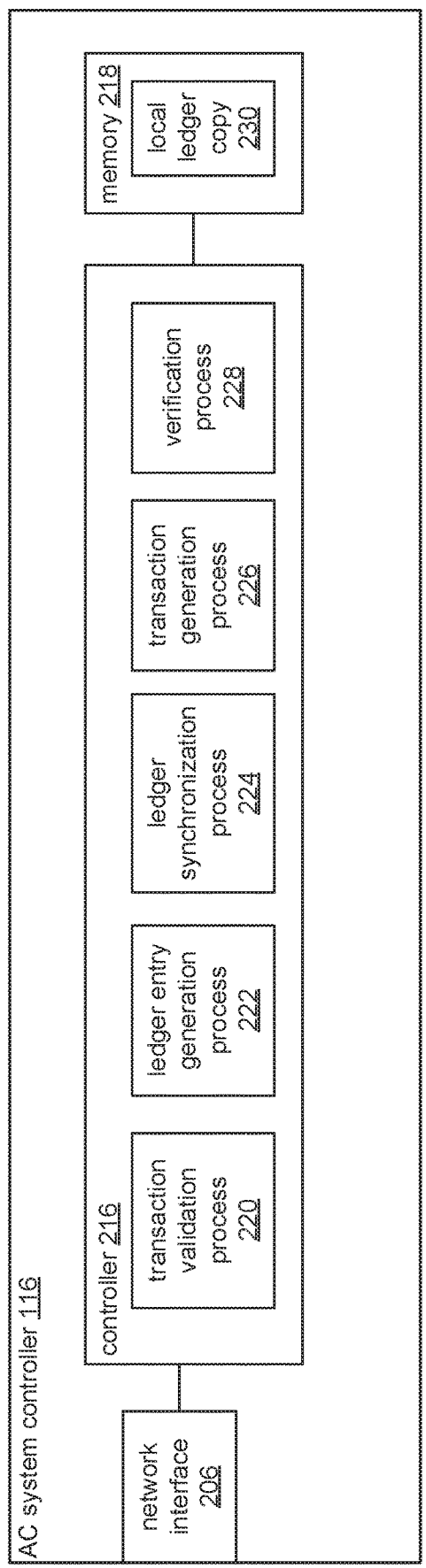
FIG. 2 is a schematic diagram of an exemplary system controller of the access control system.
Figure 3A:
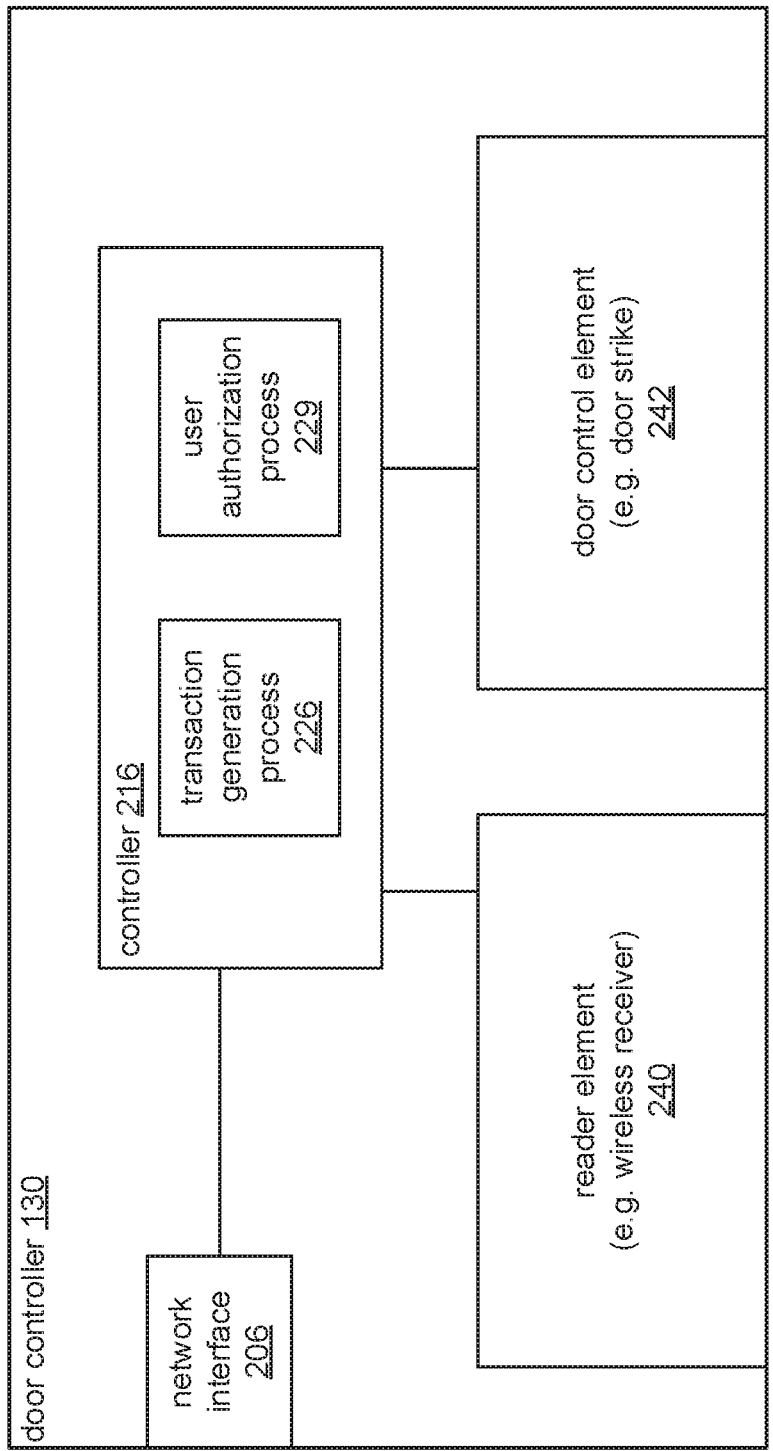
FIG. 3A is a schematic diagram of an exemplary door controller of the access control system.
Figure 3B:
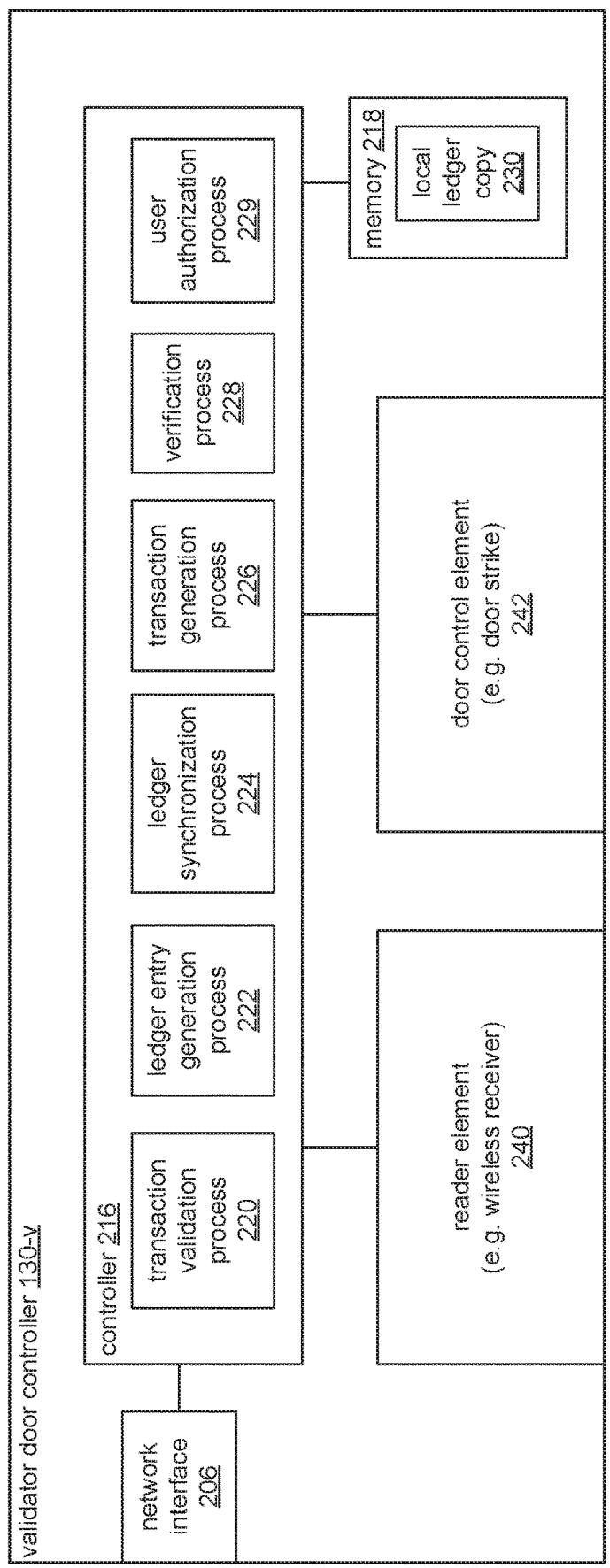
FIG. 3B is a schematic diagram of an exemplary validator door controller of the access control system.

In general, FIGS. 2, 3A, and 3B are schematic diagrams of the devices of the access control system 100 that maintain the distributed transaction ledger and/or perform the access control functions. These include the system controller 116, the door controller 130 and the validator door controller 130, respectively. Each of these devices 116, 130, 130-v similarly includes a controller 216, and a network interface 206. Each device 116, 130, 130-v connects to the safety and automation network 111 and/or the public and/or private network via the network interface 206, which can provide wired and/or wireless connections. The controller 216 executes firmware instructions along with particular processes for directing the access control functionality of the device and maintaining the distributed ledger. Additionally, the system controller 116 and the validator door controller 130-v comprise nonvolatile memory 218 for storing local copies of the transaction ledger 230.

More specifically, FIG. 2 is a schematic diagram of an exemplary system controller 116 of the access control system according to the embodiments depicted in FIGS. 1A and 1C. As previously mentioned, the system controller 116 includes the controller 216, the network interface 206, and the nonvolatile memory 218. In some embodiments, the system controller 116 and memory 218 are integrated on a common microcontroller.

Executing on the controller 216 of the system controller 116 is a transaction validation process 220, a ledger entry generation process 222 a ledger synchronization process 224, a transaction generation process 226, and a verification process 228.

The transaction validation process 220 validates the transaction information from the distributed devices 130 (e.g. by confirming, based on the transaction ledger, that the distributed device 130 that generated the transaction information was authorized to post to the ledger, among other examples).

The ledger entry generation process 222 generates a new entry for the ledger (e.g. a new block in a blockchain) based on the transaction information. In one example, the new entry is generated based on a predetermined proof-of-work process (e.g. appending a random number to the end of the block until a hash of the block meets predefined criteria), or alternatively, based on a proof-of-stake process.

The ledger synchronization process 224 validates incoming new ledger entries and adds them to the local ledger copy 230 and also determines which version of the local ledger copy 230 is authoritative based on predetermined consensus criteria (such as a scoring process for new blockchains to determine the longest chain, for example).

The transaction generation process 226 generates the transaction information (e.g. based on status changes or other events occurring during the normal operation of the system controller 130). In one example, the transaction generation process 226 compiles the relevant transaction data (including time and date information) and translates the data into a predetermined format associated with the transaction ledger.

The verification process 228 receives the identification information from the door controller 130 (e.g. by retrieving the identification information from the transaction ledger in response to determining that the identification information was newly added to the ledger). The verification process 228 then verifies the identification information, for example, by retrieving the most up-to-date access control list from the local ledger copy 230 and determining whether the occupant 150 associated with the identification information is authorized to access the access point 120 being engaged.

A predetermined quantity of nodes of the validation network 101 executing the verification process 228 verify the identification information. The number of responding nodes is based on predetermined quorum information for the validation network 101 prescribing how many nodes should respond and a minimum quality of the local ledger copy 230 stored on the responding nodes. The quorum information is stored in the transaction ledger (for example, after an initial configuration process). Generally, for faster access a smaller quorum is used. For greater security, on the other hand, a larger quorum is used. The nodes coordinate their response to the door controller 130 by adding the verification information to the transaction ledger. Other nodes determine whether to respond based on how many nodes have already responded according to the ledger. The verification process 228 then sends instructions to grant (or not grant) access to the door controller 130 based on the verification information retrieved from the transaction ledger (e.g. in response to determining that a quorum of nodes unanimously responded with verification information indicating that the occupant 150 is authorized).

FIG. 3A is a schematic diagram of an exemplary door controller 130 of the access control system 100 according to the embodiment depicted in FIG. 1A. As previously mentioned, the door controller 130 includes the controller 216 and the network interface 206.

Additionally, the door controller 130 includes access control elements such as a reader element 240 and a door control element 242. The access control elements, generally, are mechanisms for performing access control functions of the access control system 100.

The reader element 240 provides a mechanism for the door controller 130 to receive input from the occupant 150 engaging with the access point 120 controlled by the door controller 130. In one example, the reader element 240 is a wireless receiver for receiving identification information wirelessly transmitted or broadcast by the user device 152 of the occupant 150 and uses possibly the Bluetooth or WiFi wireless protocols. The reader element 240 can also include user interface elements such as a graphical user interface (GUI), keypad, microphone, and/or magnetic strip reader, among other examples.

The door control element 242 provides a mechanism for the door controller 130 to grant or restrict access through the access point 120. In one example, the door control element 242 is a door strike for locking a door. In another example, the door control element 242 can include an elevator control system for opening or closing elevator doors.

The previously described transaction generation process 226 executes on the controller 216 of the door controller 130 along with a user authorization process 229.

The user authorization process 229 receives the identification information via the reader element 240 and sends it to be verified by the validation network 101. In one example, the user authorization process 229 first sends the identification information to the transaction generation process 226 executing locally on the door controller 130, which generates transaction information based on the identification information (e.g. by formatting it according to a uniform standard used by the transaction ledger), and then sends the transaction information to the validation network 101 to be added to the distributed ledger. The user authorization process 229 grants access to the access point via the door control element 242 (e.g. by unlocking the door via the door strike) based on instructions from the system controller 116.

FIG. 3B is a schematic diagram of an exemplary validator door controller 130-v of the access control system 100, according to the embodiments depicted in FIGS. 1B and 1C. The validator door controller 130-v includes the controller 216, nonvolatile memory 218, network interface 206, reader element 240 and door control element 242. Additionally, executing on the controller 216 are the transaction validation process 220, the ledger entry generation process 222, the ledger synchronization process 224, the transaction generation process 226, the verification process 228, and the user authorization process 229.

Here, in addition to the previously described examples for the verification process 228 and the user authorization process 229, the verification process 228 executing on the validator door controller 130-v sends instructions to grant (or not grant) access to the user authorization process 229 executing locally. Similarly, the user authorization process 229 executing on the validator door controller 130-v grants access to the access point 120 via the door control element 242 (e.g. by unlocking the door via the door strike) based on instructions from the verification process 228 executing locally.

Figure 4:
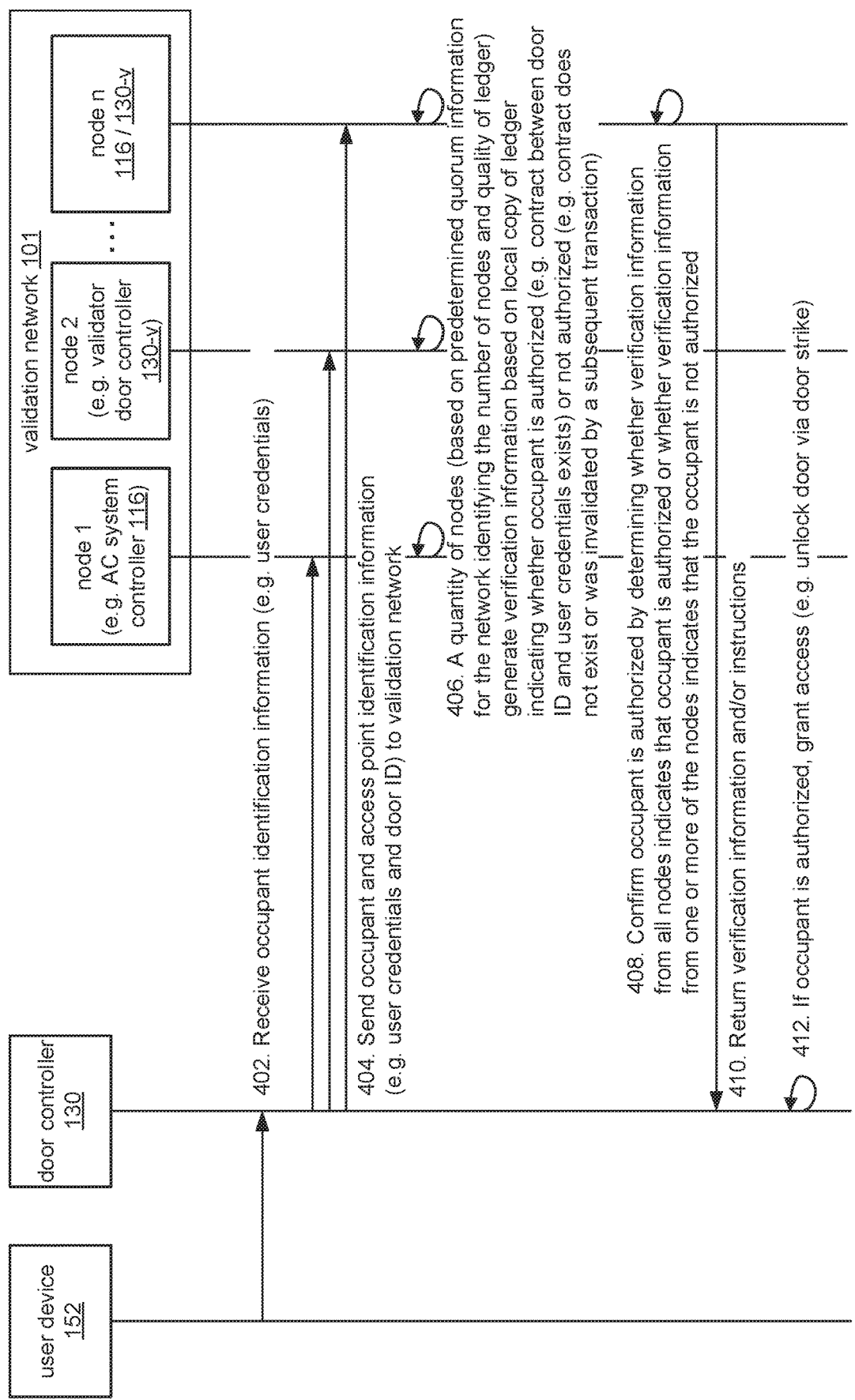
FIG. 4 is a sequence diagram illustrating the process by which the door controller controls access through access points based on verification information generated by the validation network.

FIG. 4 is a sequence diagram illustrating the process by which the door controller 130 controls access through the access point 120 based on verification information generated by the validation network 101.

First, in step 402, the door controller 130 receives identification information associated with an occupant 150 requesting access through the access point 120 from the user device 152 of the occupant 150 via the reader element 240. In one example, the user device 152 is an identification badge with a wireless transmitter that wirelessly transmits the identification information to a wireless receiver of the door controller 130. In another example, the user device is a smartphone mobile computing device that executes an app that transmits the identification information. In some cases, the identification information is hashed using a one-way hash.

In step 404, the door controller 130 sends the identification information for the occupant 150 along with identification information for the access point 120 to the system controllers 116 and/or validator door controllers 130-v operating as nodes of the validation network 101. In one example, the door controller 130 first generates transaction information via the transaction generation process 226, the transaction information indicating the identification information for both the occupant 150 requesting access and the access point 120. The door controller 130 then broadcasts the transaction information to the validation network 101 to be validated and stored to the distributed ledger according to the transaction validation process 220, ledger entry generation process 222, and ledger synchronization process 224 executing on the nodes of the validation network 101.

In step 406, the validation network 101 verifies the identification information and generates verification information indicating whether the occupant 150 associated with the identification information is authorized to access the access point 120 based on authorization information retrieved from the transaction ledger. More specifically, a quantity of system controllers 116 and/or validator door controllers 130-v operating as nodes of the validation network 101 retrieve the identification information for the occupant 150 requesting access and the access point 120 from their respective local copies of the transaction ledger 230 and verify the identification information against authorization information from the local ledger copies 230, generating verification information that is then added to the transaction ledger as further transaction information. In one example, the nodes determine whether a contract exists in the transaction ledger between the occupant 150 and the access point 120, or whether a contract does not exist or was invalidated by a subsequent transaction.

Once a quorum has been reached (e.g. the predetermined number of nodes have verified the identification information and added verification information to the transaction ledger), in step 408, one of the system controllers 116 and/or validator door controllers 130-v operating as nodes of the validation network 101 confirms the verification information. The node that confirms the verification information can be the first node to determine that the quorum has been reached, the validator door controller 130-v that originally received and broadcast the identification information, the node closest to the door controller 130 that originally received and broadcast the identification information, among other examples. Either way, the node confirms the verification information by determining whether the verification information from all responding nodes indicates that the occupant 150 is authorized, or, on the other hand, whether the verification information from one or more responding nodes indicates that the occupant 150 is not authorized and sends instructions accordingly in step 410. In the former case, the node sends instructions to the door controller 130 to grant access, whereas in the latter case, the node sends instructions to the door controller 130 to deny access. In this way, the authorization information (e.g. access control list) from a predetermined proportion of local ledger copies 230 must match in order for access to be granted by the door controller 130.

In step 412, the door controller 130 grants or denies access to the occupant 150 through the access point 120 based on the instructions from the validation network 101. If the occupant 150 is authorized, the door controller 130 grants access via the door control element 242 (e.g. by unlocking the door via the door strike). If the occupant 150 is not authorized, the door controller 130 denies access.

Figure 5:
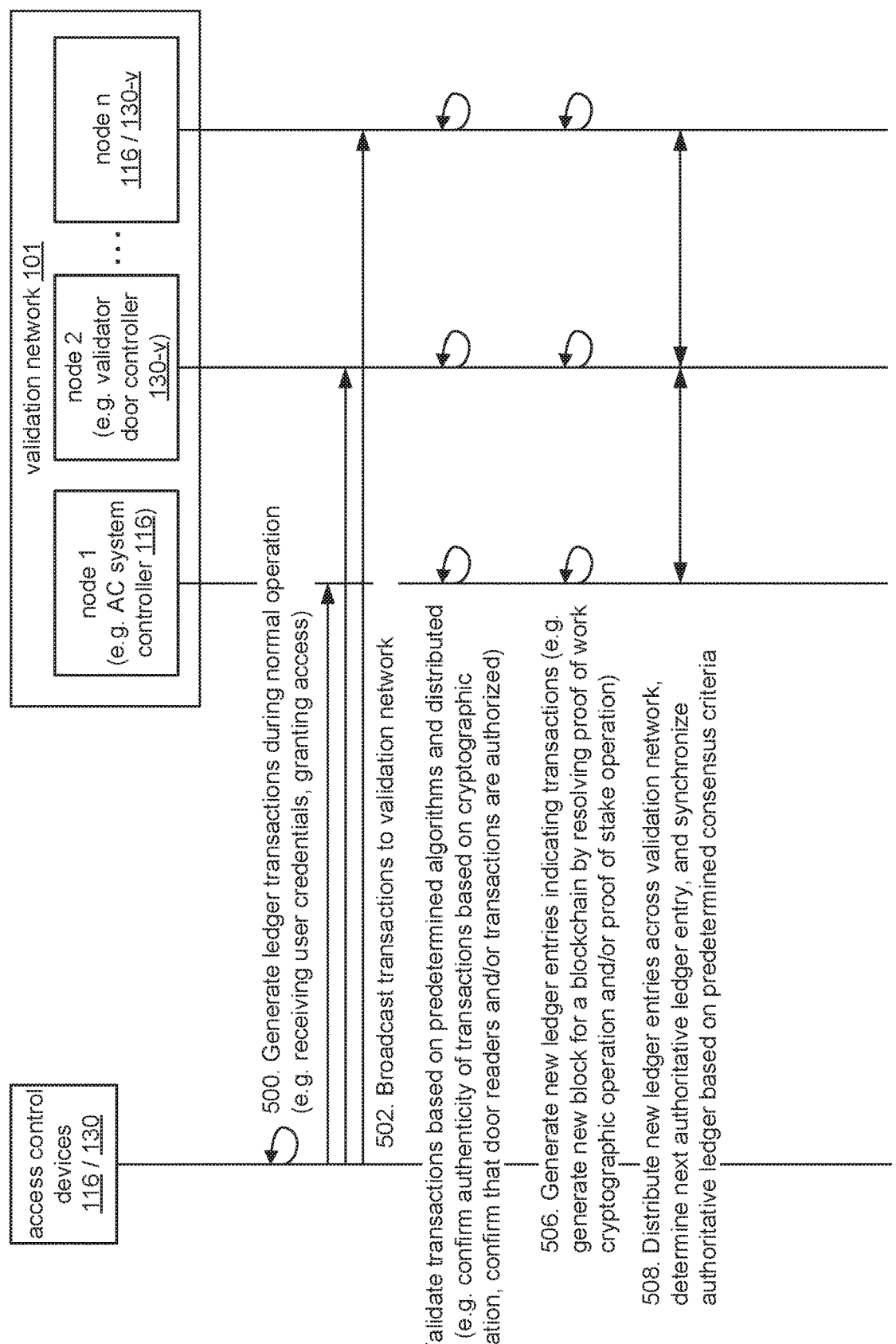
FIG. 5 is a sequence diagram illustrating the process by which the door controllers, system controllers and validation network maintain a distributed transaction ledger.

FIG. 5 is a sequence diagram illustrating the process by which the door controllers 130, system controllers 116 and validation network 101 maintain the distributed transaction ledger.

First, in step 500, the access control devices, including the system controllers 116 and the door controllers 130, 130-*v* generate ledger transactions via the transaction generation process 226 during the normal operation of the access control system 100 (e.g. while receiving user credentials, generating verification information, locking/unlocking doors, detecting door position).

In step 502, the access control devices 116, 130 broadcast the transaction information generated in step 500 to the validation network 101.

In step 504, the system controllers 116 and validator door controllers 130-*v* operating as nodes of the validation network 101, via the transaction validation process 220, validate the transactions based on predetermined algorithms and, for example, the local copy of the transaction ledger 230 accessible to the nodes performing the validation. In different examples, different system controllers 116 and/or validator door controllers 130-*v* can validate transactions from the same access control devices 116, 130 simultaneously or from different access control devices 116, 130. In the former example, subsequent ledger entry generation and synchronization processes ensure that transaction information is not duplicated on the transaction ledger.

In step 506, the system controllers 116 and validator door controllers 130-*v* operating as nodes of the validation network 101 generate new ledger entries indicating the transaction information. In one example, the nodes collect a series of transactions and then generate a block (e.g. for a blockchain) including the transactions. In different examples, the block is generated by resolving a proof of work cryptographic operation or a proof of stake operation.

In step 508, the system controllers 116 and validator door controllers 130-*v* operating as nodes of the validation network 101, via the ledger synchronization process 224, distribute the new ledger entries across the validation network 101, determine the next authoritative ledger entry, and synchronizes the authoritative ledger based on predetermined consensus criteria. The validation network 101 determines and synchronizes the authoritative ledger entry, for example, based on a process of evaluating versions of the local ledger copies 230 with respect to each other using scoring and/or consensus criteria and selecting the more authoritative version, the result of which is the widespread adoption of a single authoritative version of the transaction ledger across the validation network 101.

The transaction ledger, distributed as local ledger copies 230 stored in nonvolatile memory 218 of the system controllers 116 and validator door controllers 130-*v* operating as nodes of the validation network 101, is then used to determine the behavior of the access control devices 116, 130 as demonstrated, for example, in steps 402 through 412.

Figure 6:
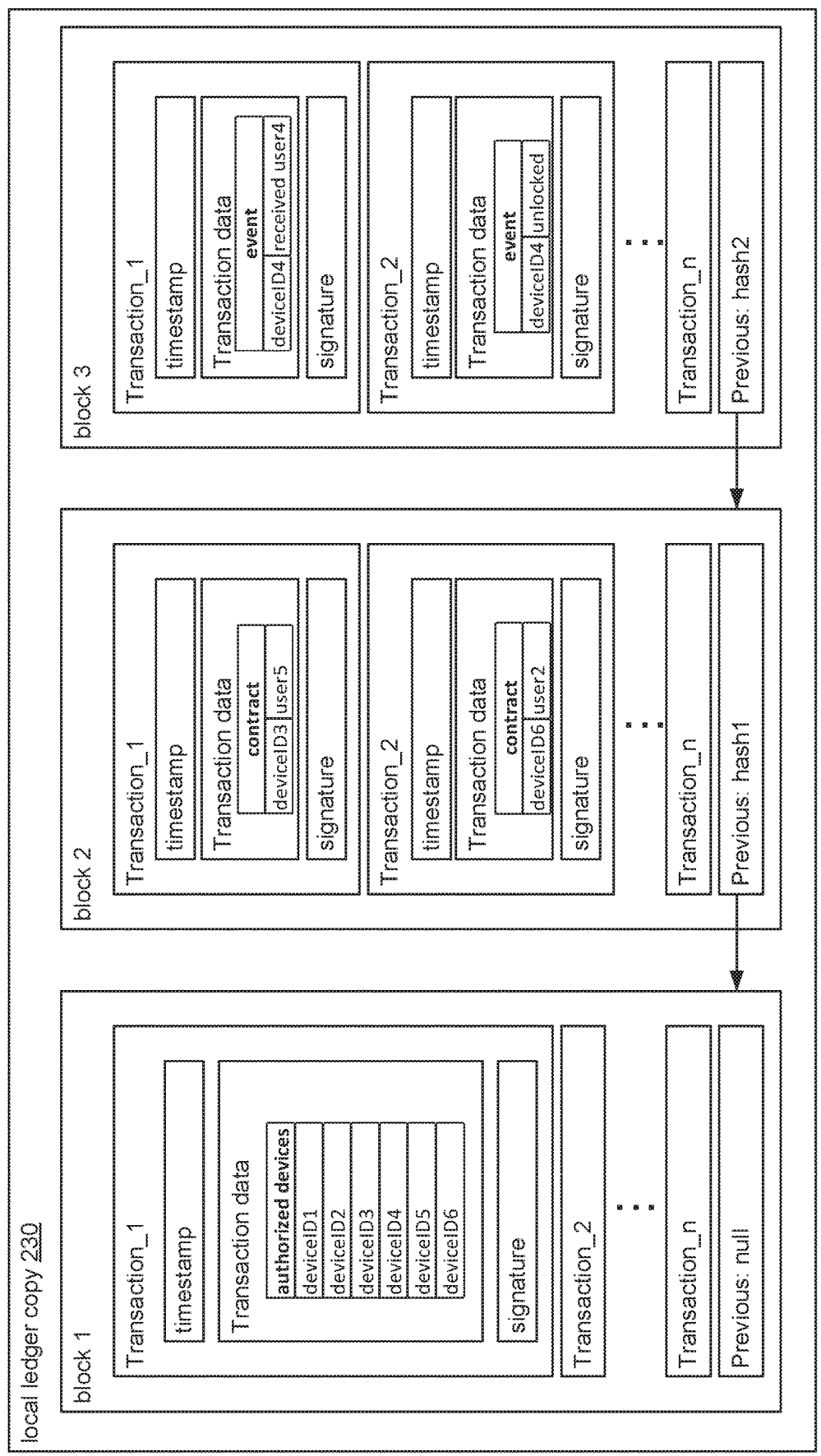
FIG. 6 is a schematic diagram illustrating an exemplary transaction ledger for the access control system.

FIG. 6 is a schematic diagram illustrating an exemplary transaction ledger for the access control system 100.

In the illustrated example, the transaction ledger is a blockchain, in which each ledger entry (or block) in a sequence of ledger entries contains a cryptographic hash of a preceding block along with the transaction information. The blockchain includes three ledger entries, block 1, block 2, and block 3. Block 1, being the original block, refers to "null" as the preceding block. Block 2 includes "hash1," which is a cryptographic hash of the entire contents of block 1, based on a predetermined cryptographic hash function. Similarly, block 3 includes "hash2," which is a cryptographic hash of the entire contents of block 2. In this way, the blocks form a chain, with each subsequent block referring to the preceding block.

Each of blocks 1, 2 and 3 comprise multiple transactions (Transaction_1, Transaction_2, . . . , Transaction_n). Each of the transactions includes a timestamp indicating date and time information associated with the transaction, transaction data, and a signature, which is generated upon validation of the transaction data (for example, via the transaction validation process 220).

For example, Transaction_1 of block 1 includes transaction data indicating a list of devices (deviceID1 through deviceID6) which might be used to validate whether transactions are from a predetermined set of devices authorized to post to the transaction ledger. Transaction_1 of block 2 includes as transaction data an authorization contract between deviceID3 and user5, indicating that user5 is authorized to access the access point 120 controlled by the door controller 130 identified as deviceID3. Similarly, Transaction_2 of block 2 includes as transaction data an authorization contract between deviceID6 and user2, indicating that user2 is authorized to access the access point 120 controlled by the door controller 130 identified as deviceID6. Transaction_1 of block 3 includes transaction data indicating that the door controller 130 identified as deviceID4 received the identification information for the occupant 150 identified as user4. Finally, Transaction_2 of block 3 includes transaction data indicating a status change for deviceID4, namely that the device was unlocked.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operation of an access control system of a premises, the method comprising:
   door controllers of the access control system receiving identification information from user devices;
   nodes of a validation network of the access control system receiving the identification information from the door controllers, generating verification information based on the identification information and on local copies of a transaction ledger and sending the verification information to the door controllers;

the door controllers controlling access to access points of the premises based on the verification information;

selecting which of the nodes receive the identification information and generate the verification information based on predetermined quorum information for the validation network, wherein the predetermined quorum information prescribes a predetermined quantity of nodes to generate the verification information and a predetermined quantity of local copies of the transaction ledger to be queried during each access attempt; and granting access to the access points in response to determining that the predetermined quantity of nodes unanimously responded with verification information indicating that the occupants are authorized to access the access points.

2. The method as claimed in claim 1, wherein the transaction ledger is a blockchain.

3. The method as claimed in claim 1, wherein the transaction ledger includes authorization information for the access points.

4. The method as claimed in claim 3, wherein the authorization information includes contracts associating identification information for the users with identification information for the access points for which the users are authorized.

5. The method as claimed in claim 4, further comprising the nodes generating verification information indicating that the users are authorized to access the access points in response to determining that valid contracts between the users and the access points exist.

6. The method as claimed in claim 4, further comprising the nodes generating verification information indicating that the users are not authorized to access the access points in response to determining that valid contracts between the users and the access points do not exist.

7. The method as claimed in claim 3, wherein the authorization for the access points includes an access control list indicating authorized occupants of the building for each access point.

8. The method as claimed in claim 7, wherein the nodes generate the verification information by retrieving an up-to-date access control list from the local copies of the transaction ledger and determining whether an occupant associated with the identification information is authorized to access the access points.

9. The method as claimed in claim 1, wherein the nodes of the validation network include system controllers of the access control system.

10. The method as claimed in claim 1, wherein the nodes of the validation network include the door controllers, and the door controllers verify identification information received by other door controllers.

11. The method as claimed in claim 1, further comprising the door controllers granting access in response to determining that all of the verification information received from the nodes indicates that the users are authorized and the door controllers denying access in response to determining that the verification information received from one or more of the nodes indicates that the users are not authorized.

12. The method as claimed in claim 1, further comprising the door controllers generating transaction information indicating identification information for occupants requesting access and identification for access points being engaged by the occupants and broadcasting the transaction information to the validation network to be stored to the transaction ledger.

13. The method as claimed in claim 12, wherein the nodes receive the identification information from the door controller by retrieving the identification information from the local copies of the transaction ledger in response to determining that the identification information was newly added to the transaction ledger.

14. The method as claimed in claim 1, wherein the transaction ledger includes a log of access control events and historical configuration information and user authorization information, which are permanently added to the ledger in real time and can be accessed by the system controllers, door controllers and other distributed devices, technicians and/or security personnel.

15. The method as claimed in claim 1, wherein the predetermined quorum information is stored in the transaction ledger after an initial configuration process.

16. The method as claimed in claim 1, further comprising the predetermined quantity of nodes coordinating responses to the door controllers by adding the verification information to the transaction ledger.

17. The method as claimed in claim 16, further comprising the nodes determining whether to respond to the door controllers based on how many nodes have already responded according to the transaction ledger.

18. The method as claimed in claim 16, further comprising the door controllers controlling access to the access points based on verification information retrieved from the transaction ledger.

19. The method as claimed in claim 1, further comprising denying access to the access points in response to determining that one or more of the predetermined quantity of nodes responded with verification information indicating that the occupants are not authorized to access the access points.

20. An access control system of a premises, the system comprising:

door controllers for receiving identification information from user devices and controlling access to access points of the premises; and a validation network comprising nodes for receiving the identification information from the door controllers, generating verification information based on the identification information and on local copies of a transaction ledger and sending the verification information to the door controllers;

wherein the door controllers control access to the access points based on the verification information, selections of which nodes receive the identification information and generate the verification information are based on predetermined quorum information for the validation network, the predetermined quorum information prescribes a predetermined quantity of nodes to generate the verification information and a predetermined quantity of local copies of the transaction ledger to be queried during each access attempt, and the door controllers grant access to the access points in response to determining that the predetermined quantity of nodes unanimously responded with verification information indicating that the occupants are authorized to access the access points.

21. The system as claimed in claim 20, wherein the transaction ledger is a blockchain.

22. The system as claimed in claim 20, wherein the transaction ledger includes authorization information for the access points.

23. The system as claimed in claim 22, wherein the authorization information includes contracts associating identification information for the users with identification information for the access points for which the users are authorized.

24. The system as claimed in claim 23, wherein the nodes generate verification information indicating that the users are authorized to access the access points in response to determining that valid contracts between the users and the access points exist.

25. The system as claimed in claim 23, wherein the nodes generate verification information indicating that the users are not authorized to access the access points in response to determining that valid contracts between the users and the access points do not exist.

26. The system as claimed in claim 20, wherein the nodes of the validation network include system controllers of the access control system.

27. The system as claimed in claim 20, wherein the nodes of the validation network include the door controllers, and the door controllers verify identification information received by other door controllers.

28. The system as claimed in claim 20, wherein the door controllers grant access in response to determining that all of the verification information received from the nodes indicates that the users are authorized, and the door controllers deny access in response to determining that the verification information received from one or more of the nodes indicates that the users are not authorized.

29. A method of operation of an access control system of a premises, the method comprising:
   door controllers of the access control system receiving identification information from user devices;
   nodes of a validation network of the access control system receiving the identification information from the door controllers, generating verification information based on the identification information and on local copies of a transaction ledger and sending the verification information to the door controllers; and
   the door controllers controlling access to access points of the premises based on the verification information,
   wherein the transaction ledger includes access control events indicating identification information and access point information for each time an access point is engaged with by an occupant and whether access was granted or denied, status information for the door controllers including information about status changes of the door controllers, whether access points are locked or unlocked, configuration information, and the verification information for access control attempts.

30. A method of operation of an access control system of a premises, the method comprising:
   door controllers of the access control system receiving identification information from user devices;
   nodes of a validation network of the access control system receiving the identification information from the door controllers, generating verification information based on the identification information and on local copies of a transaction ledger and sending the verification information to the door controllers;
   the door controllers controlling access to access points of the premises based on the verification information; and
   selecting which of the nodes receive the identification information and generate the verification information based on predetermined quorum information for the validation network, wherein the predetermined quorum information prescribes a predetermined quantity of local copies of the transaction ledger to be queried during each access attempt and a minimum quality for the local copies of the transaction ledger stored on the nodes generating the verification information.

31. A method of operation of an access control system of a premises, the method comprising:
   door controllers of the access control system receiving identification information from user devices;
   nodes of a validation network of the access control system receiving the identification information from the door controllers, generating verification information based on the identification information and on local copies of a transaction ledger and sending the verification information to the door controllers;
   the door controllers controlling access to access points of the premises based on the verification information; and
   selecting which of the nodes receive the identification information and generate the verification information based on predetermined quorum information for the validation network, wherein the predetermined quorum information prescribes a predetermined quantity of local copies of the transaction ledger to be queried during each access attempt, and access is only granted to the access points when a predetermined percentage of the local copies of the transaction ledger include an access control list indicating that occupants requesting access should be allowed to access the access points.

32. A method of operation of an access control system of a premises, the method comprising:
   door controllers of the access control system receiving identification information from user devices;
   nodes of a validation network of the access control system receiving the identification information from the door controllers, generating verification information based on the identification information and on local copies of a transaction ledger and sending the verification information to the door controllers;
   the door controllers controlling access to access points of the premises based on the verification information; and
   selecting which of the nodes receive the identification information and generate the verification information based on predetermined quorum information for the validation network, wherein the predetermined quorum information prescribes a predetermined quantity of local copies of the transaction ledger to be queried during each access attempt, and the predetermined quorum information indicates a relatively small number of local copies of the transaction ledger to be queried and/or a relatively large number of local copies to be queried based on desired speed of access and desired level of security.

* * * * *